United States Patent
Abel

(10) Patent No.: US 6,722,247 B2
(45) Date of Patent: Apr. 20, 2004

(54) APPARATUS FOR SUSPENDING A SAW BLADE IN A PARALLELOGRAM-TYPE SUSPENSION JIGSAW

(76) Inventor: Helmut Abel, 11 bis, av. Edouard VII, F-78600 Moisons-Laffitte (FR)

( * ) Notice: Subject to any disclaimer, the term of this patent is extended or adjusted under 35 U.S.C. 154(b) by 0 days.

(21) Appl. No.: 10/045,905

(22) Filed: Nov. 7, 2001

(65) Prior Publication Data

US 2002/0073822 A1 Jun. 20, 2002

(30) Foreign Application Priority Data

Nov. 7, 2000 (DE) .......................... 100 55 049

(51) Int. Cl.[7] ............................ B27B 19/02; B26D 1/00
(52) U.S. Cl. ............................ 83/784; 83/662; 83/542; 83/699; 83/21
(58) Field of Search ................ 83/784, 748, 783, 83/786, 602, 542, 699.21, 662, 628, 954, 785

(56) References Cited

U.S. PATENT DOCUMENTS

| | | | | |
|---|---|---|---|---|
| 19,534 A | * | 3/1858 | Shaw ........................... | 83/784 |
| 82,585 A | * | 9/1868 | Baxter ......................... | 83/784 |
| 141,048 A | * | 7/1873 | Hansen ........................ | 83/781 |
| 164,787 A | * | 6/1875 | Wescott et al. ............... | 83/784 |
| 2,692,622 A | * | 10/1954 | Heese .......................... | 83/782 |
| 5,768,971 A | * | 6/1998 | O'Banion et al. ............ | 83/784 |
| 6,363,822 B2 | * | 4/2002 | Lei .............................. | 83/58 |

* cited by examiner

Primary Examiner—Boyer D. Ashley
(74) Attorney, Agent, or Firm—Pendorf & Cutliff

(57) ABSTRACT

A device for suspending one end of a saw blade (28) in a first arm (14) of a parallelogram-jigsaw, having a second arm (18) parallel to the first arm and having a a saw blade clamp (38) mounted pivotably with respect to the first arm (14). A third arm (36) is provided parallel to the first arm (14) as positive guide and pivotably mounted, of which the length can be slightly extended or reduced in the longitudinal direction under load. The saw blade clamp (38) is mounted pivotably on the ends of the respective first arm (14) and third arm (36) which ends are opposite the rotation axis (12, 43).

6 Claims, 1 Drawing Sheet

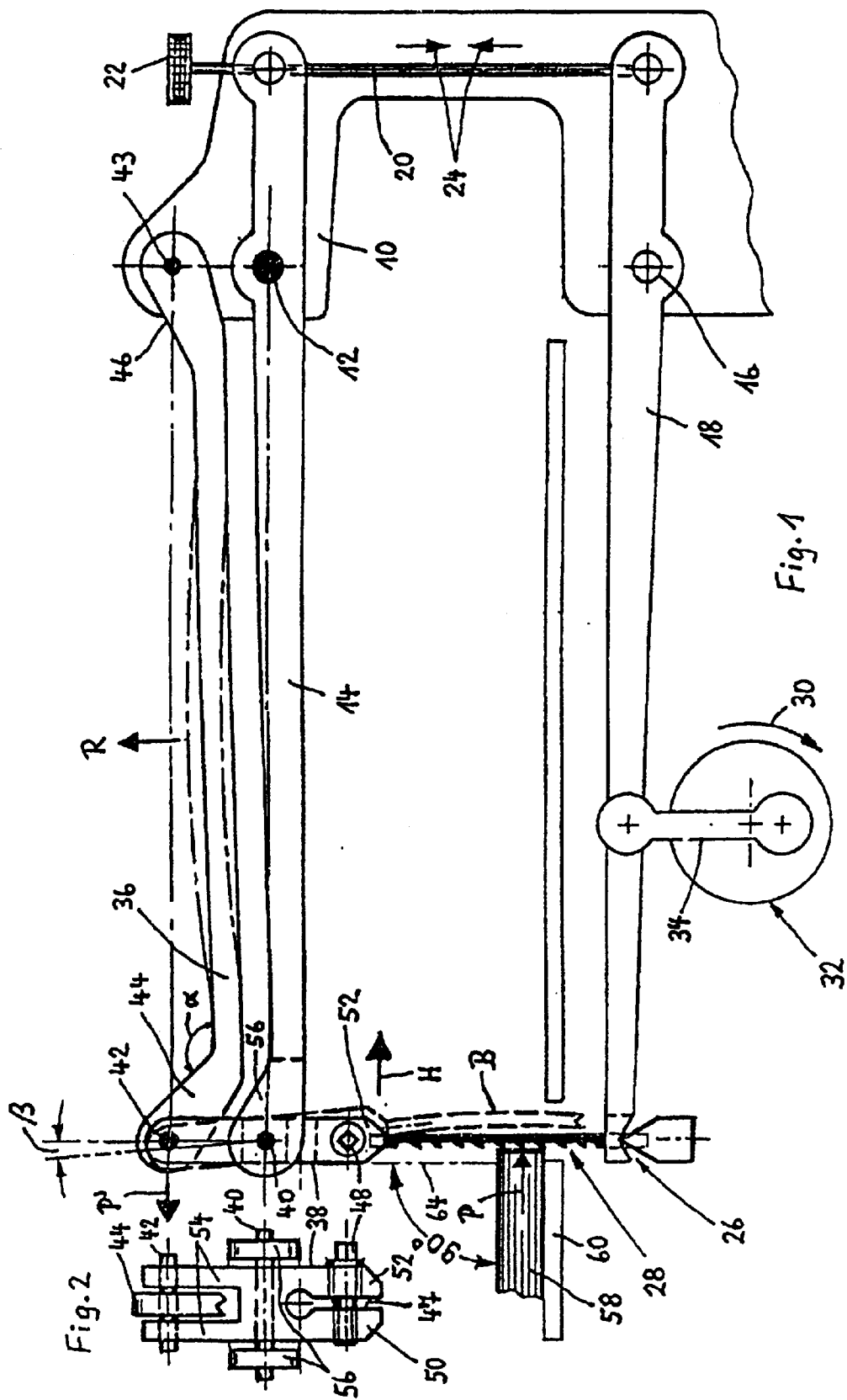

APPARATUS FOR SUSPENDING A SAW BLADE IN A PARALLELOGRAM-TYPE SUSPENSION JIGSAW

BACKGROUND OF THE INVENTION

1. Field of the Invention

The invention concerns a device for suspending one end of a saw blade.

2. Description of the Related Art

The term "parallelogram-jigsaw" is basically intended to refer to any jig or fret saw in which a saw blade is secured or hung from the ends of two parallel arms pivoting in a parallelogram like manner. The saw blade holding ends of the arms are spread apart by a saw blade tensioner. They are limitedly flexible-elastic. Generally, one of the two arms is motor driven via a drive spindle, so that the saw blade moves back and forth in the longitudinal direction. In all known parallelogram saws and similar saws, the freeing of the upper saw blade end from the guiding arm, the subsequent insertion of the free end through a pre-borehole or an internal cutout in the work piece, and the subsequent securing of the saw blade back on the arm is relatively complicated and, with respect to the demands placed on the saw blade during sawing, is rather problematic. In some of the known saws, the saw blade clamps for securing the saw blade end may be easily accessible and operable, however they rigidly hold the saw blade ends or rigidly guide the same. Such saw blade clamps cannot exercise any pivoting movement with respect to the guide arm to which they are secured, whereby the saw blade breaks after a relatively short work time at its securing zone.

One known design of a parallelogram saw, which is produced by the company Hegner, VS-Schwenningen, Germany, is provided with a clamping device, which bears the logo "Special saw blade clamp for internal cuts." This knife-edge shaped special clamp with frontal horizontally extending blade insertion slit and its blade securing point above its slit is pressed in the V-shaped receiving slit of the carrying parallelogram arm by means of a pressure screw situated above this clamp, whereby it remains completely rigid. So that any acceptable sawing process is even possible with this rigidly secured clamp, the stroke length of this parallelogram saw must be reduced. A non-blockage of this clamp would not be possible, since it would immediately tip or fold over under the high blade tension of the thin blade, since the blade securing point in this clamp is above its support slit. The saw blade naturally bends during each upward stroke below its securing point and breaks after a short period of time, usually already during idling. The sawing process is, besides this, very noisy. The cut is not clean and is imprecise, since the saw blade does not move correctly horizontally.

Further, the world wide known parallelogram-jigsaw of the Italian Company COLOMBO-FILLIPETTI for manufacturing of intarsia uses rigid saw blade clamps, which are rigidly screwed together.

In a second design of a known parallelogram saw, according to DE 2 334 911 C2, there is at the tip of the upper arm a knife edge or slit shape and free floating or pendulum saw blade clamp, which is supported by a receiving fork. Prior to each opening of the clamp, this must first be fixed or blocked using supplemental means, since it would otherwise fold or tip over. Besides this, the reintroduction of the upper blade and into the clamp slit frequently requires multiple attempts, since the fine slit in the receiving fork restricts the view onto the clamp. It is only by chance that the saw blade is correctly positioned in the clamp center.

A third design of a known parallelogram saw, namely the parallelogram-jigsaw well known in the United States of America and Canada under the name "EXCALIBUR" from the company Tom Sommervile Design and Manufacturing, Inc., South Pickering, Ontario, Canada, with a saw blade clamp hung on the tip of the upper arm via a saw blade clamp hung for free and unlimited pendulum motion in the rotation axis, is on the one hand not restricted to the clamp slit, however during opening or closing of the clamp, this must first be held fast or blocked temporarily by some type of assisting device, for example a knock-out spindle, since otherwise a proper use thereof would not be possible. During closing of the clamp using a screw, the clamp easily turns in the rotation direction of the screw, and the blade can break. During opening, the clamp can pivot in the opposite direction, and the blade can threby also easily break. A further significant disadvantage of this design is comprised therein, that the clamp moves towards the back under the influence of medium-strong advance pressure of the work piece against the saw blade, whereby the saw blade deforms too strongly in a bow-like manner, and the cut surfaces at the work piece are convex or concave rather than being planar.

SUMMARY OF THE INVENTION

In accordance with the invention, a device is to be produced for suspending or securing one end of a saw blade on a first arm of a parallelogram-jigsaw or fret saw, which makes possible a substantially more rapid and secure mounting of the saw blade end on the arm, and at the same time, strongly reduces the risk of a break of the saw blade. At the same time, the device should guarantee a planar cut surface on the work piece.

The inventive device does not exhibit the above-discussed disadvantages of known devices of this type. In the inventive device, the saw blade end, preferably the upper saw blade end, is easily or lightly hung with free pendulum motion and can very rapidly and without problem, as well as without technical supplemental means or procedures, be secured again to the associated arm after release which makes possible the rapid, and production line like, carrying out of internal cut-outs.

In accordance with the invention a third arm forms a positive guide and runs freely along with the other two parallelogram arms. If the work piece during sawing suddenly produces a too high a pressure, then a counter force is produced at the pivot axis of the saw blade clamp. The saw blade clamp exerts then a pull force upon the limitedly elongatable third arm, which thereupon lengthens a slight amount. Usually it bows thereby simultaneously a small amount in the direction perpendicular to its longitudinal direction, the third arm which thus has become slightly longer makes it possible that the lower end of the saw blade clamp moves in a pendulum motion a bit towards the rear, that is, towards the rear side of the saw blade. The saw blade thereby forms a slight bow, whereupon however the upper saw blade end in the area just below the saw blade clamp remains completely straight, so that at this area it is not subjected to any amount of bending forces. It thus does not break. The third or force guidance arm continuously exerts a certain amount of a dampening effect with respect to the pressure exercised upon the saw blade clamp, which depends upon the changeable work piece advance rate.

If on the other hand during sawing suddenly a too high a pressure is exerted upon the saw blade back side, that is during turning or pulling of a work piece, then there is produced a pressure effect upon the third or positive guide arm, so that this is made somewhat shorter. The lower end of the saw blade clamp moves in a pendulum then a bit towards the front, whereby again the upper saw blade end in the area just below the saw blade clamp remains completely straight, and this does not suffer from any amount of bending forces and thus does not break. Here also the positive guide arm works as a dampener.

Particularly advantageous is the embodiment with an insertion slot for the saw blade accessible from below on the saw blade clamp. If one desires during the standby operation of the upper saw blade end for the purpose of manufacturing an internal cut out to free this from the saw blade clamp, it is sufficient to release the clamp screw. The clamp remains thereby in vertical orientation, since it is positively guided by a third arm, which does not lengthen or shorten, and since the torque on the screw exercises too small of an effect on the third arm. A temporary blockage of the saw blade clamp with supplemental means and a corresponding time loss can thus be dispensed with when using the inventive device. The clamp does not move forwards or towards the rear, either during opening or during closing thereof.

Various designs of the inventive third or positive guidance arm can be envisioned. Thus for example, a simple elongated rod of elastic material can be employed, or a non-elastic rod with only an a amount of elastic material for a pivoting mounting at the end of the third arm can be employed. A simple design can also be comprised therein, that both ends of a rod comprised of an only slightly elastic material and an upward or downward bend is provided, preferably both ends bent upwards or both downwards, so that doing pull or pressure load these bent ends can bend somewhat and thereby produce a slight yet effective elongation, or as the case may be, shortening of the arm. Also, multiple bends of the arm in different directions or spirals of the rod-shaped arm could provide minimal elongations or shortenings during pull or push forces against the arm. It is also possible to incorporate a piston-cylinder arrangement at an interruption point of the arm, whereby in the cylinder on both sides of the piston an elastic material can be employed, so that likewise doing pull or pressure load of the arm slight elongations or shortenings of the arm result in the longitudinal direction thereof.

In certain cases, the elasticity of the third arm can even be very small, whereby the pendulum motion of the saw blade cramp is quite limited, however on the basis of the already present play or tolerance of the rotation axis at both ends of the arm an effective elongation or shortening of the effective third arm can nevertheless occur and therewith a slight pendulum motion of the saw blade clamp can occur.

It is basically preferred to provide the third arm, in the case of vertical orientation of the parallelogram saw, above the first and second arms, which form the parallelogram. In principle, it is however possible to also provide the third arm at the lower side of the saw, that is below the saw table.

BRIEF DESCRIPTION OF THE DRAWINGS

A preferred embodiment of the invention will be described in greater detail on the basis of the figures. There is shown:

FIG. 1 a schematic side view of a parallelogram-jigsaw, in which the inventive device is employed, and FIG. 2 a view rotated 90° about the vertical axis as compared to FIG. 1 of a part of the saw blade clamp of the invention and adjacent parts of the device.

DETAILED DESCRIPTION OF THE INVENTION

The parallelogram saw represented in the figures includes a stationary saw frame 10, to which the rear end of a first arm 14 is mounted pivotably about a rotation axis 12 and the rear end of a second arm 18 is mounted parallel thereto and pivotable about a rotation axis 16. Rearward of the rotation axis 12 and 16, that is, in FIG. 1 towards the right from the rotation axis, a so-called saw blade tensioner 20 is connected with the arms 14 and 18, which pulls the two arms 14 and 18 more or less strongly together in the sense of the arrow 24 at their rear ends via a screw head 22, and thereby spreads the front ends apart, the ends which in FIG. 1 are to the left. The arms 14 and 18 are maintained essentially parallel therein.

At the front, that is, the left end of the second arm 18 in FIG. 1, a cut or knife type clamp 26 well known in the art of parallelogram-saws is provided for the lower end of a saw blade 28. An eccentric disc 32 which can be brought into rotation according to arrow 30 by a not shown drive motor is connected via a connecting rod 34 with the second arm 18 and via the saw blade tensioner 20 with a first arm 14 in such a manner that upon rotation of the eccentric disc 32, the two front, that is, the left ends as shown in FIG. 1, of the arms 14 and 18 are moved upwards and downwards.

The inventive device for suspending or tensioning in the upper end of the saw blade 28 is comprised essentially of a third arm 36 provided parallel to and above the first arm 14 and a saw blade clamp indicated generally with reference number 38. The saw blade clamp 38 is connected pivotable about a rotation axis 40 with the front end of the first arm 14 and connected pivotably about a rotation axis 42 with the front end of the third arm 36. At the rear end, the third arm 36 is connected with the saw frame 10 pivotable about a rotation axis 43. At the front and rear ends, the third arm 36 respectively exhibits an upwardly slightly angled end segment 44, or as the case may be 46, through which the rotation axis 42, or as the case may be 43, passes.

The lower end of the saw blade clamp 38 is formed as vertical, downwardly open insertion slot 47 for the upper end of the saw blade 28. A tightening screw 48 is introduced perpendicular to the insertion slot 47 through the lower end of the saw blade clamp 38 and bridges over the insertion slot 47. After the upper end of the saw blade 28 is inserted, this can be secured in the insertion slot 47 by tightening of the tightening screw 48. By this tightening of the tightening screw 48, basically the two jaws 50 and 52 formed by the insertion slot 47 of the saw blade clamp 33 are drawn elastically together and do not tension, as is frequently the case in known clamps, the end of the saw blade 28 with a friction force in the direction of rotation of the tension screw 48, so that no bending of the saw blade end occurs either during tensioning of the tensioning screw 43 or during the loosening thereof.

The slightly angled front end 44 of the third arm 36 extends to a fork guide 54 at the upper end of the saw blade clamp 38 and is in this matter guided pivotably about the rotation axis 42. On the other hand, the front end of the first arm 14 is provided with a fork guide 56, which engages around the center of the saw blade clamp 38 and guides this pivotably about the rotation axis 40. It would in principle also be possible to design the fork guide 54 deeper or lower and to also guide the front end of the first arm 14 in the fork guide 54. Likewise, the front end of the third arm 36 could in similar manner to the shown embodiment be provided with a fork guide, which could extend around the upper end of the saw blade clamp 38. In this case, no fork guide would have to be provided at the saw blade clamp 38. These designs are substantially equivalent and could be employed as desired.

In the representation of FIG. 1, the connecting rod 34 and therewith the three arms 14, 18, and 36 are at their bottom dead center, and thus at the lower end of a downward moving work stroke of the saw blade 28. Upon further rotation of the eccentric disc 32 in a sense of the arrow 30, the saw blade 28 moves upwardly in the lifting stroke. The work piece 58 to be sawed lies horizontally upon the saw table 60 and is advanced with the pressure P against the front side of the saw blade 28 provided with saw teeth. The work piece 58 forms an angle of approximately 90° to the vertical 64. The drive force of the not shown drive motor is essentially transmitted to the second arm 18 and the first arm 14, however not directly upon the third arm 36, so that this freely follows along with the movement of the first and second arms. If work piece 58 suddenly exerts too high a pressure during sawing, that is, the advance pressure P, then the saw blade 28 forms a bow B curved slightly towards the rear, as indicated with dashed lines. At the same time, a counter pressure P' is produced at the upper end axis 42 of the saw blade clamp 38 lightly yielding and pivoting about the rotation axis 40 of the first arm 14, which engages in the rotation axis 42 of the third arm 36. Thereby, there results a slight enlargening of the angle α between the third arm 36 and the therefrom angled away end segment 44 by elastic deformation. This effectively produces a lengthening of the third arm 36 under the tensioning, whereby it simultaneously bends in the direction R perpendicular to its longitudinal direction. The third arm 36 which has thereby been somewhat lengthened makes possible a pivoting of the saw blade clamp 38 with its lower end 50, 52 about a small angle β in the direction of the arrow H. Besides the slight bowing B of the saw blade in this position (the saw blade clamp 38 is also indicated with dashed lines in this position) the saw blade 28 is not bent near the entry point in the insertion slot 47, but rather remains in this area essentially completely straight, so that no bend loads are produced upon the saw blade 38 and no danger of breakage is present. When the saw blade is no longer tensioned by the work piece 58, the parts return to their positions shown in FIG. 1 with solid lines, whereby the third or positive guide arm 36 bends back to its normal position and thereby pulls the saw blade clamp 38 in its vertical normal or standard position.

The positive guide arm 36 continuously exerts a certain dampening effect, which dampens the variable work piece pressure. If during sawing suddenly a too-high pressure occurs on the saw blade rear side, for example during turning or pulling of a work piece, then there results the reverse, a counter or reverse pressure effect on the positive guide arm 36, so that this becomes somewhat shortened, whereby it bends slightly downwards in this case and the angle α becomes somewhat smaller. The saw blade clamp 38 pivots in this case with its lower end slightly towards the front, whereby again the upper saw blade end in the area just below the entry point in the insertion slot 47 remains completely straight and thereby it is neither subjected to a bending load nor is caused to break. In this case also during an exercise of the reverse pressure on the saw blade, the third or positive guide arm 36 likewise performs as a damper for the occurring pressure forces.

If one desires to free the upper saw blade end out of the upper saw blade clamp 38 during idling of the machine for the purpose of producing an internal cut-out, it is sufficient to release the tension screw 48. The saw blade clamp 38 remains thereby in the vertical position, positively guided by the third arm 36, which in this case does not lengthen, since the torque on the tensioning screw 48 has too small an effect on the third arm 36. Thereby, the temporary blocking of the saw blade clamp with supplemental means as conventional with known devices can be dispensed with, and thus there is no loss of time. The saw blade clamp 38 which pivots slightly under exercise of pressure does not escape, as would a freely pivoting clamp, towards the front or the rear, and this neither during opening nor during closing of the insertion slot 38. It is thus possible to secure or release the upper saw blade end very rapidly and completely without problem when respectively one internal cut-out is to be carried out, when in known manner the free saw blade end must be inserted through a pre-drilled hole in the work piece. Frequently a large number of internal cut-outs must be carried out, one after the other, that is, the upper saw blade end must then be continuously released from its securing point and must again be inserted therein as rapidly as possible. The inventive device makes it possible to completely secure the upper saw blade end only at its outer end, with a length of approximately four mm, whereby almost the entire blade length is accessible above the saw blade table 60 and also particularly tall or high work pieces can be processed in simple manner, since a particularly large height passage below the upper saw blade clamp 38 is made possible.

A significant advantage of the inventive device is comprised therein, that is a consequence of the positive guidance of the third arm 36 during normal advance pressing P of the work piece 58 no strong bow shaped deflections B of the saw blade 28 occurr towards the rear, which would be the case when using known freely pivoting saw blade clamps. This strong bowing out of the saw blade would result in convex, or as the case may be, concave cut surfaces on the work piece 58, while in the case of the inventive device the cut surfaces remain generally substantially planar.

What is claimed is:

1. A device for suspending one end of a saw blade in a parallelogram-jigsaw comprising:
    a stationary frame;
    a first arm;
    a second arm parallel to the first arm and having a saw blade clamp mounted pivotably with respect to the first arm;
    said first and second arms on their end opposite to the saw blade mounted on said stationary frame pivotably about parallel pivot axis,
    a third arm (36) is provided parallel to the first arm (14) and on a side thereof opposite to the second arm (18), said third arm mounted pivotably about a rotation axis (43) parallel to the rotation axis (12, 16) of the first and second arms (14, 18), wherein the length of said third arm lengthens or shortens in the longitudinal direction under load, and wherein the saw blade clamp (38) is mounted pivotably on the ends of the respective first arm (14) and third arm (36) opposite the rotation axis (12, 43).

2. A device according to claim 1, wherein the third arm (36) is comprised completely or partially of an elastic material.

3. A device according to claim 1, wherein the saw blade clamp (38) includes an insertion slot (47) for one end of the saw blade (28), which slot is bridged over by a tensioning screw (48) for clamping the saw blade (28) in the insertion slot (47).

4. A device according to claim 3, wherein either the saw blade clamp (38) on its end opposite to the insertion slot (47) or an engaging end of the third arm (36) exhibits a fork guide (54), and wherein an overlapping or engaging end (44) of the third arm (36) or the insertion slot (47) opposing end of the saw blade clamp (38) is guided pivotably with a guide means in the respective fork guide (54), whereby a pivot axis (42) passes through fork guide (54) and guide means (44).

5. A device according to claim 4, wherein the end of the first arm (14) engaging the saw blade clamp (38) is guided pivotably in the fork guide (54) of the saw blade clamp (38).

6. A device according to claim 4, wherein the end of the first arm (14) engaging the saw blade clamp (38) exhibits a fork guide (56) in which the saw blade clamp (38) is guided pivotably.

* * * * *